(12) United States Patent
Goodman (10) Patent No.: US 6,324,320 B1
(45) Date of Patent: *Nov. 27, 2001

(54) OPTICAL APPARATUS FOR PRODUCING A HIGH-BRIGHTNESS MULTI-LASER RADIATION SOURCE

(75) Inventor: Douglas S. Goodman, Sudbury, MA (US)

(73) Assignee: Polaroid Corporation, Cambridge, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 09/238,366

(22) Filed: Jan. 27, 1999

Related U.S. Application Data (63) Continuation-in-part of application No. 09/042,885, filed on Mar. 17, 1998, now Pat. No. 6,075,912.

(51) Int. Cl.[7] .................................................... G02B 6/32
(52) U.S. Cl. .............................. 385/33; 385/31; 359/618
(58) Field of Search ................................. 385/31, 33, 34, 385/35, 47, 49; 359/618, 629, 639

(56) References Cited

U.S. PATENT DOCUMENTS

| | | | |
|---|---|---|---|
| 3,827,059 | 7/1974 | Rambauske | 350/294 |
| 4,621,890 | 11/1986 | Suzuki et al. | 350/6.1 |
| 4,828,357 | 5/1989 | Arata et al. | 350/174 |
| 5,048,911 | 9/1991 | Sang et al. | 385/33 |
| 5,077,750 | 12/1991 | Pocholle et al. | 372/68 |
| 5,099,358 | 3/1992 | Okazaki | 359/503 |
| 5,148,326 | 9/1992 | Hohberg | 359/853 |
| 5,210,643 | 5/1993 | Fujii et al. | 359/638 |
| 5,333,077 | 7/1994 | Legar et al. | 359/619 |
| 5,355,249 | * 10/1994 | Souda et al. | 359/341 |
| 5,408,553 | 4/1995 | English, Jr. et al. | 385/36 |
| 5,418,880 | 5/1995 | Lewis et al. | 385/123 |
| 5,533,163 | * 7/1996 | Muendel | 385/126 |
| 6,075,912 | * 6/2000 | Goodman | 385/33 |

FOREIGN PATENT DOCUMENTS

| | | |
|---|---|---|
| 0473071 | 3/1992 | (EP) . |
| WO96/21877 | 12/1995 | (WO) . |
| WO99/47959 | 9/1999 | (WO) . |

OTHER PUBLICATIONS

Geometrical and Instrumental Optics, vol. 25, ed. D. Malacara, 1988, §4.4 Afocal Systems, pp. 132–142.

PCT International Search Report for PCT/US00/01017 (Form PCT/ISA/210) (mailed May 26, 2000).

* cited by examiner

Primary Examiner—John D. Lee
Assistant Examiner—Sarah U. Song
(74) Attorney, Agent, or Firm—Orlando Lopez (57) ABSTRACT

An optical apparatus is disclosed suitable for coupling discrete sources of radiation beams onto the input end of an optical fiber or a fiber laser, the optical apparatus comprising a unitary beam deflector having a plurality of deflecting facets where each deflecting facet is oriented so as to deflect an incident beam of radiation into the fiber, an input afocal relay optical system to image a beam of radiation onto a corresponding deflecting facet, and an output afocal relay optical system to image the facet beam images onto the optical fiber or laser fiber end.

32 Claims, 8 Drawing Sheets

OPTICAL APPARATUS FOR PRODUCING A HIGH-BRIGHTNESS MULTI-LASER RADIATION SOURCE

CROSS REFERENCE TO RELATED APPLICATION

This application is a continuation-in-part of commonly-assigned application Ser. No. 09/042,885, filed on Mar. 17, 1998, now U.S. Pat. No. 6,075,912.

BACKGROUND OF THE INVENTION

1. Field of the Invention

This invention in general relates to an apparatus for coupling diverse sources of radiation into a waveguide device, such as an optical fiber or fiber laser, and, in particular, to a system using a unitary deflecting component to provide such coupling.

2. Description of the Prior Art

There continues to be a need for ever-increasing levels of radiative power in applications such as printing, fabrication, and medical treatment. A commonly-used approach is to optically couple the emission beams from multiple radiative sources into an optical fiber or a fiber laser such that output radiation having a higher power level or more than one wavelength is emitted from the waveguide. The relevant art disclosed various configurations of such optical coupling systems. U.S. Pat. No. 5,418,880 issued to Lewis et al., for example, discloses a high-power fiber device powered by a linear array of laser diodes. The optical coupling system comprises an optical beam rotator for transforming the output of the laser diode array and transmitting the transformed output to collimating optics from which the radiation is coupling into the waveguide. In another approach, U.S. Pat. No. 5,333,077 issued to Legar et al. discloses a lens system comprising a first optical element for receiving and redirecting a laser beam from a linear diode array, for example, and a second optical element for further redirecting the laser beam to a focal point.

When greater levels of emitted power are required, discrete sources of radiation, such as laser diode devices, may be used. However, because of larger physical sizes and greater cooling requirements of these discrete devices, they cannot be emplaced in close proximity to one another and, consequently, cannot be adapted to be used in conjunction with the coupling devices designed for linear diode arrays. Rather, a plurality of separate mirrors is typically used to redirect the multiple radiation beams from discrete devices into the optical waveguide. For example, U.S. Pat. No. 4,828,357 issued to Arata et al. discloses an apparatus producing a high-power laser beam comprising a plurality of directing mirrors, a plurality of reflecting mirrors, and a central focusing mirror for focusing the resultant laser beam into one focal point. Another approach is disclosed in U.S. Pat. No. 5,210,643 issued to Fujii et al. in which an improved efficiency of combining laser beams is achieved through the use of suitably positioned dichroic mirrors and a beam splitter.

Unfortunately, the use of an arrangement of separate mirrors results in a system sensitive to misalignment and inadvertent movement, which results in complexity of alignment. Moreover, the use of multiple, separate mirrors makes it difficult to maintain the relative alignment of linearly-polarized beams at the waveguide input facet without the use of additional optical elements.

While the prior art describes a variety of optical coupling devices, there does not appear to have been disclosed in the relevant art a unitary device for coupling diverse sources of radiation into a waveguide, and it is a primary object of this invention to provide such a device.

It is another object of the present invention to provide such a device which can be used with sources of laser radiation which may differ in output power, wavelength, modulation, or polarization.

It is a further object of the present invention to provide such a device with which beams can be combined while maintaining relative alignment of the beam directions of polarization.

Other objects of the invention will be obvious, in part, and, in part, will become apparent when reading the detailed description to follow.

SUMMARY OF THE INVENTION

The present invention discloses an apparatus suitable for coupling the emissions from diverse sources of radiation into a waveguide such as an optical fiber or a fiber laser. The apparatus comprises a unitary beam deflector with a deflecting facet corresponding to each radiation source, an input afocal relay system for each irradiated facet, and an output afocal relay system disposed between the irradiated facets and the fiber. The apparatus and diverse radiation sources combine to produce a desired radiation output. Other features of the invention will be readily apparent when the following detailed description is read in connection with the drawings.

BRIEF DESCRIPTION OF THE DRAWINGS

The structure and operation of the invention, together with other objects and advantages thereof, may best be understood by reading the detailed description to follow in connection with the drawings in which unique reference numerals have been used throughout for each part and wherein.

DESCRIPTION OF THE PREFERRED EMBODIMENTS

Figure 1:
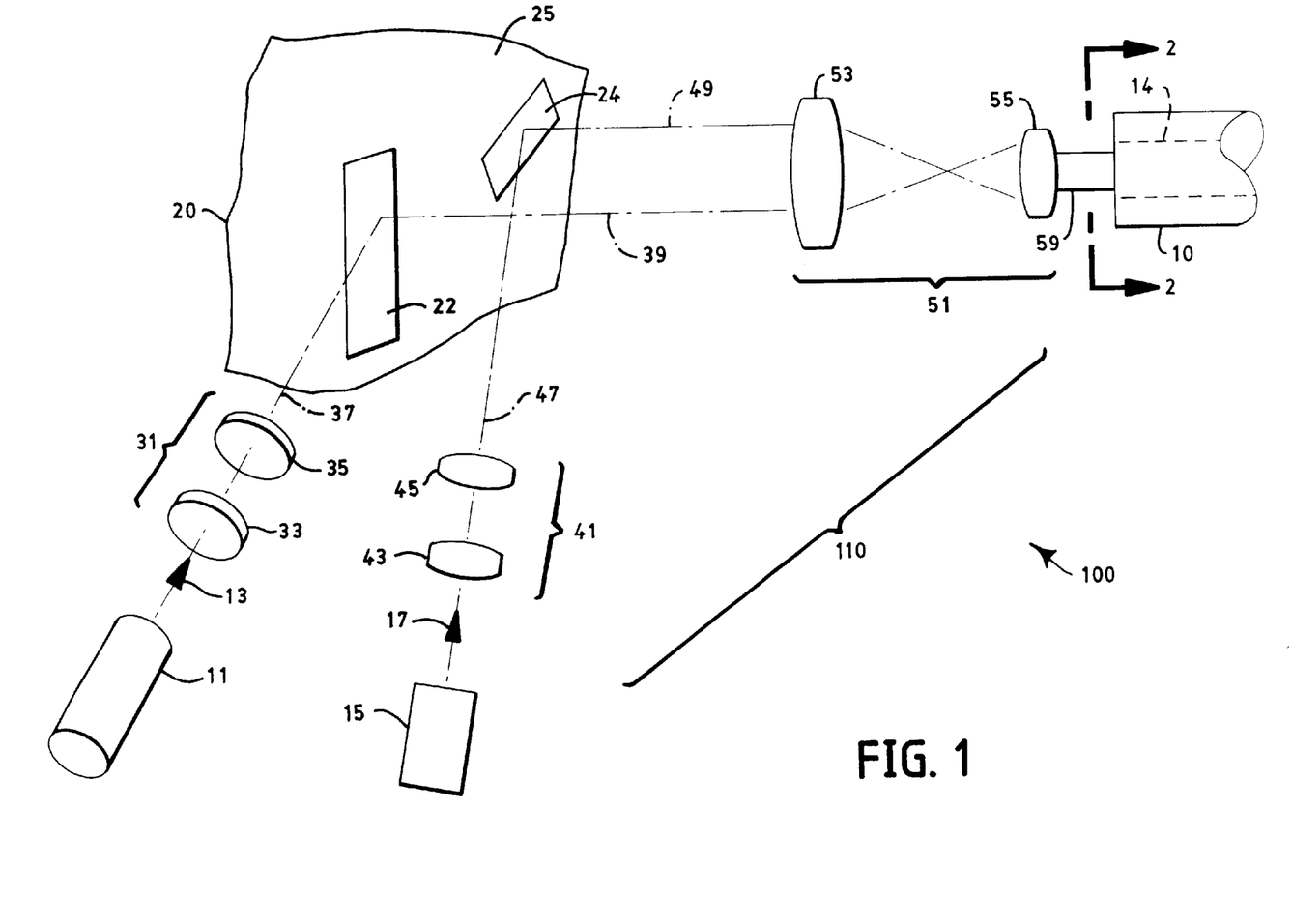
FIG. 1 is a diagrammatic perspective view of an embodiment of an apparatus for coupling radiation beams, in accordance with the present invention, illustrating the coupling of the emissions from two discrete laser devices into an optical fiber.

There is shown in FIG. 1 a system 100, in accordance with the present invention, which provides for the coupling of continuous-wave or pulsed optical radiation, such as laser radiation beams 13 and 17 emitted by discrete laser devices 11 and 15, into a fiber laser or, as shown here, an optical fiber 10. Laser devices 11 and 15 emit output radiation of wavelengths $\lambda_1$ and $\lambda_2$, respectively, where neither the wavelengths, the polarization, the output power levels, or pulse timing need be the same. The coupling of laser radiation beams 13 and 17 into optical fiber 10 is accomplished by means of an optical apparatus 110. Only two discrete laser devices are shown in the diagram, for purpose of clarity in illustration, and it should be understood that the present invention is not so limited and can be readily practiced with additional laser devices having one or more emission wavelengths, or with non-coherent radiation sources such as light-emitting diodes (LED) or an incandescent devices such as tungsten filament or arc lamps. Optical apparatus 110 comprises a unitary beam deflector 20, a first input optical system 31, a second input optical system 41, and an output optical system 51.

Unitary beam deflector 20 comprises two deflecting facets 22 and 24, where deflecting facet 22 is positioned in an optical path 37 of radiation beam 13 and oriented so as to deflect radiation beam 13 into optical fiber 10 along an optical path 39. Similarly, deflecting facet 24 is positioned in an optical path 47 of radiation beam 17 and is oriented so as to deflect radiation beam 17 into optical fiber 10 along an optical path 49. As can be appreciated by one skilled in the relevant art, deflecting facets 22 and 24 are preferably optically-smooth and reflective surfaces, as distinguished from a non-faceted surface region 25 of unitary beam deflector 20. Alternatively, deflecting facets 22 and 24 may comprise diffraction surfaces, or unitary beam reflector 20 may comprise an optically-transparent material and produce deflection by means of total internal reflection. It should also be noted that the distance along optical path 37 between laser device 11 and deflecting facet 22 need not be the same length as the distance along optical path 47 between laser device 15 and deflecting facet 24.

Deflecting facets 22 and 24 are substantially planar and may be formed in unitary beam deflector 20 by known methods, such as by diamond machining. It can be appreciated by one skilled in the relevant art that, while a particular method of machining may produce essentially planar deflecting facets having a slight cylindrical curvature, such facets can be also be used in practicing the present invention. In an alternative method of manufacture, unitary beam deflector can be fabricated as more than one component and formed into a unitary part by appropriate means. In a preferred embodiment, deflecting facets 22 and 24 are subsequently plated or optically coated so as to increase reflectivity at the wavelengths of the emissions of lasers 11 and 15. It should also be noted that, as it is not a requirement that radiation beams 13 and 17 lie in a common plane with optical fiber 10, the axes normal to the surfaces of deflecting facets 22 and 24 need not be coplanar.

First input optical system 31 preferably comprises an afocal relay system, an optical configuration well-known in the relevant art (see, for example, "Afocal systems," *Geometrical and Instrumental Optics*, vol. 25, Academic Press, Inc., 1988, pp. 132–42). In the example provided, first input optical system is shown comprising a first lens 33 and a second lens 35 placed in optical path 37 of radiation beam 13. Lenses 33 and 35 are positive power elements having principal planes spaced apart by a distance ($f_{33}+f_{35}$), where $f_{33}$ is the focal length of first lens 33 and $f_{35}$ is the focal length of second lens 35. First lens 33 and second lens 35, either or both of which may comprise an anamorphic element, form an afocal relay system and serve to image the smallest portion of radiation beam 13 onto deflecting facet 22. As is understood by one skilled in the relevant art, for a radiation source such as a laser diode, the smallest portion of the radiation beam is at the diode output facet. For a laser diode, therefore, afocal relay optical system 31 images the diode output facet onto deflecting facet 22. Alternatively, for a single-mode radiation source, the smallest portion of the radiation beam (i.e., the waist) would be imaged onto deflecting facet 22. Similarly, a first lens 43 and a second lens 45, placed in optical path 47, serve to image the smallest portion of radiation beam 17 onto deflecting facet 24.

Output optical system 51 preferably comprises an afocal relay system and, for purpose of illustration, is here shown comprising a first lens 53 and a second lens 55 placed in optical paths 39 and 49 of deflected radiation beams 13 and 17. First lens 53 and second lens 55 serve to image deflected radiation beams 13 and 17 as a focused group of beam images 59 into a core 14 at input facet 19 of optical fiber 10. It can be appreciated that, for best coupling efficiency, deflecting facets 22 and 24 are shaped and sized to intercept essentially all radiation imaged by input afocal relay optical systems 31 and 41 such that this radiation is redirected along essentially parallel optical paths 39 and 49, respectively, into optical fiber 10.

In alternative embodiments, one or more afocal relay systems may be replaced with one or more optical systems which meet the criteria of: i) grouping the incident radiation beams within a desirable target area, and ii) insuring that the maximum extreme angle of any radiation beam falls within the acceptance angle, or numerical aperture, of the waveguide. Use of the preferable afocal relay system, however, serves to insure that there is no excess angle growth in the radiation beam.

Figure 2:
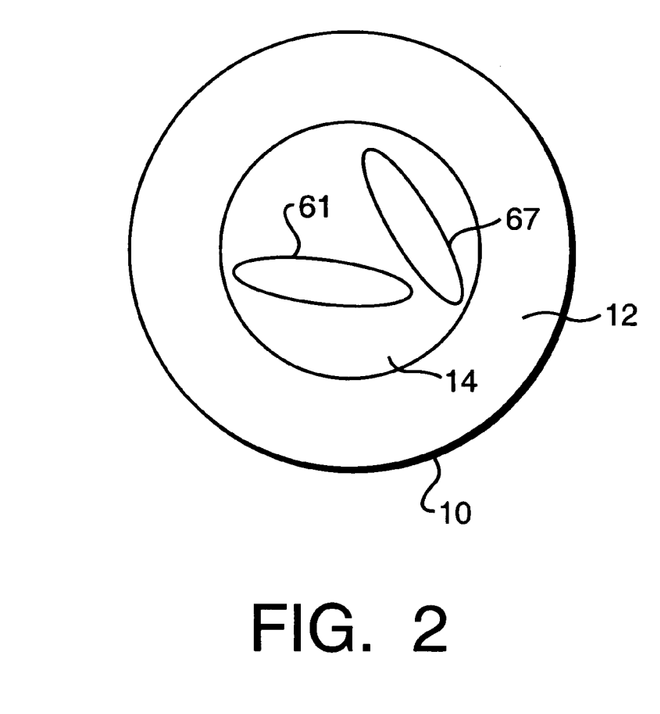
FIG. 2 is a diagram corresponding to the input end of the optical fiber of FIG. 1 illustrating the imaging of the laser emissions into the core of the optical fiber.

As best seen in FIG. 2, optical fiber 10 comprises a core 14 surrounded by a cladding layer 12. Laser beam 13 is imaged into optical fiber 10 as focused beam image 61 and laser beam 17 is imaged as focused beam image 67. For best coupling efficiency, deflecting facets 22 and 24 are sized, positioned, and oriented such that focused beam images 61 and 67 fall within core 14 as shown. Note that the transverse axes of the imaged beams need not be aligned with each other, and that the beam sizes need not be identical.

Figure 3:
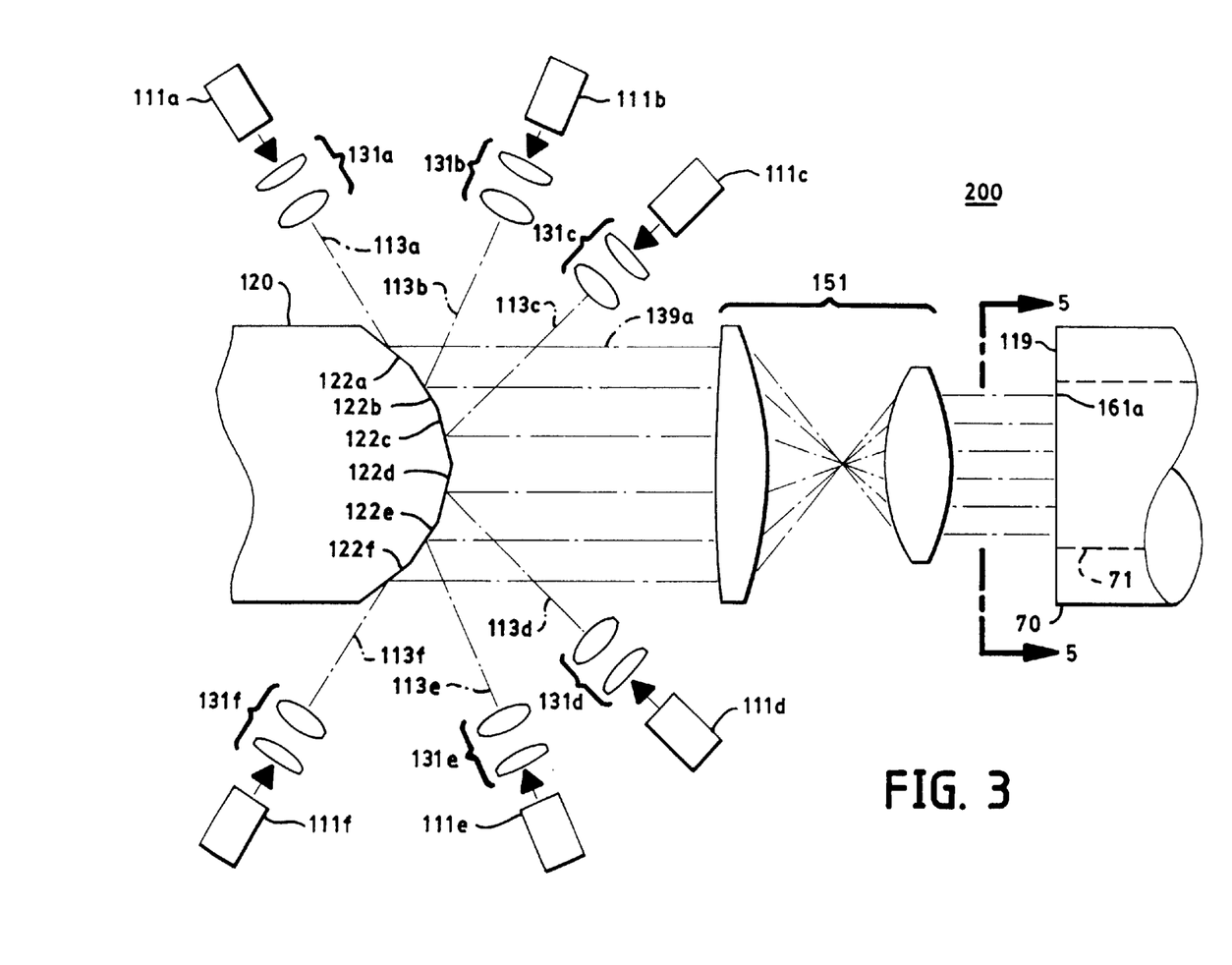
FIG. 3 is a diagrammatical plan view of an alternative embodiment of a coupling apparatus comprising a unitary beam deflector comprising six facets in accordance with the present invention illustrating the optical coupling of six sources of coherent radiation into a fiber laser.

In an alternative embodiment, shown in FIG. 3, an optical apparatus 200 is used to couple the radiation outputs of six discrete laser devices 111a through 111f, having output emissions 113a through 113f respectively, into an optical fiber or, as shown here, into inner cladding 71 of a fiber laser 70. Optical apparatus 200 comprises a unitary beam deflector 120, input afocal relay systems 131a through 131f, and output afocal relay system 151. Unitary beam deflector 120 comprises six rectangular deflecting facets 122a through 122f, where adjoining facets form a dihedral angle (e.g., facets 122f and 122e). In the example provided, the output radiation of discrete laser devices 111a through 111f propagate in the plane of FIG. 3. Accordingly, each of deflecting facets 122a through 122f is orthogonal to this plane. The dimensions of each deflecting facet 122a through 122f are selected so as to reflect most or all of the incident radiation. In the example shown, the height of each deflecting facet is sized to intercept and redirect the projection of the lateral component of the incident laser radiation, and the width of each deflecting facet is sized to intercept and redirect the projection of the transverse component of the incident laser radiation.

Figure 4:
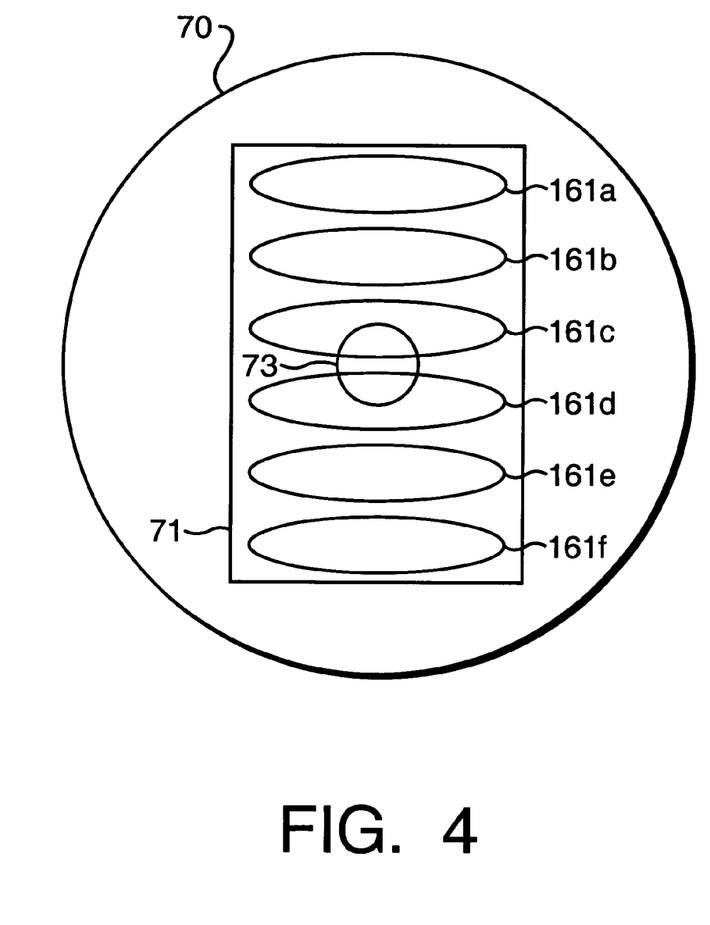
FIG. 4 is a diagram corresponding to the input end view of the fiber laser of FIG. 3 showing the emissions of the laser sources of FIG. 3 imaged into the inner cladding of the fiber laser.

Output emission 113a of laser device 111a is imaged onto deflecting facet 122a by input afocal relay system 131a. Deflecting facet 122a is oriented so as to reflect this imaged output into fiber laser 70 along optical path 139a. Output afocal relay system 151 is positioned in optical path 139 so as to image the deflected radiation onto input end 119 as a focused beam image 161a. Each of deflecting facets 122b through 122f is likewise oriented to reflect output emissions 113b through 113f from laser devices 111b through 111f respectively into fiber laser 70, as focused beam images 161b through 161f respectively, as shown in FIG. 4. Preferably, focused beam images 161a through 161f are projected into inner cladding 71. Inner cladding 71 is here shown having a rectangular cross-sectional shape, but may comprise one of a number of convex polygons (e.g., square, hexagon, rhombus, triangle) such as disclosed in commonly-assigned U.S. Pat. No. 5,533,163 issued to Muendel and incorporated herein in its entirety by reference.

Figure 5:
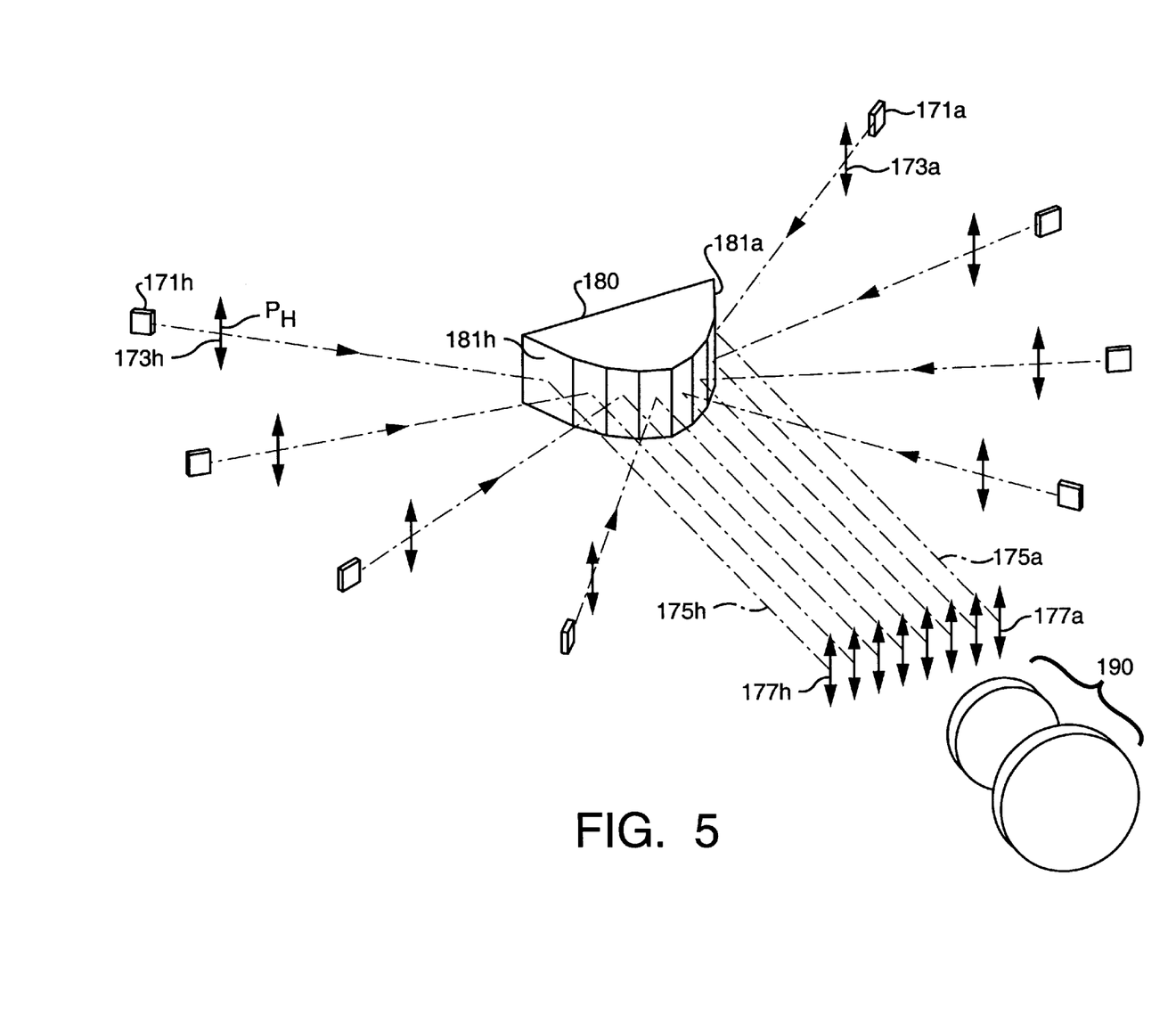
FIG. 5 is a diagrammatical perspective view of an alternative embodiment, comprising eight facets, of the unitary beam reflector of FIG. 3.

FIG. 5 shows an alternative unitary beam deflector 180 comprising eight deflecting facets 181a through 181h. Unitary beam deflector 180 maintains the relative alignment of linearly-polarized beams emitted from laser devices 171a through 171h. Beam polarization vectors components $P_A$ though $P_H$, denoted as 173a through 173h respectively, are parallel to one another prior to reflection from unitary beam deflector 180 and maintain this relative alignment after reflection, as denoted by deflected output emissions 175a through 175h having polarization vectors 177a through 177h, respectively.

Figure 6:
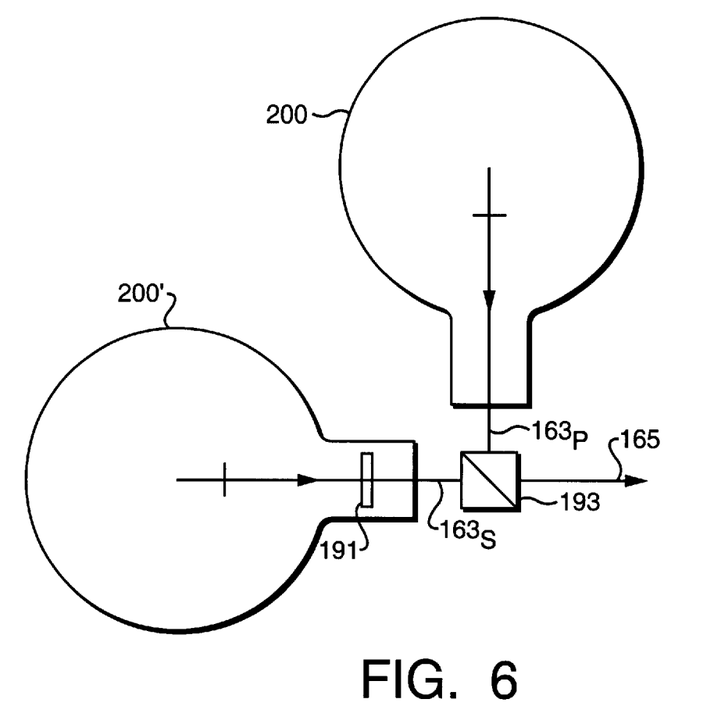
FIG. 6 is a diagrammatical plan view showing the use of a beam splitter to combine differently polarized outputs from two coupling apparatuses in accordance with the present invention.

In a preferred embodiment, laser devices 171a through 171h comprise laser diodes disposed approximately 80 mm from respective deflecting facets. Deflecting facets 181a through 181h are approximately 3.0 mm by 0.3 mm wide. An afocal relay system 190 images deflected output emissions 175a through 175h onto an fiber laser facet (not shown) as focused image beams approximately 3.0 mm by 0.05 mm. The focused image beams are preferably projected into a fiber laser comprising a square inner cladding approximately 0.2 mm by 0.2 mm. In an alternative embodiment, shown in FIG. 6, a focused beam $163_P$ from optical apparatus 200 can be combined with a focused beam $163_S$ from an optical apparatus 200' into a polarization output 165 by means of a polarization beam splitter 193. Optical apparatus 200' comprises a half-wave plate 191 in the optical path of focused beam $163_S$.

Figure 7:
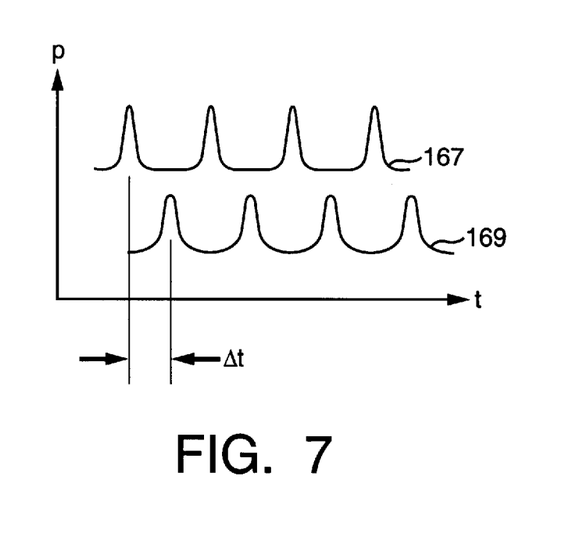
FIG. 7 is a graph showing two curves representing pulsed output emission power levels, such as may be obtained from coupling apparatuses, where the sets of pulses are temporally offset from each other.

Pulsed or modulated radiation outputs can be offset temporally to produce interdigitated emissions. As illustrated in FIG. 7, a second radiation output, represented by a curve 169, comprises pulses which occur Δt after corresponding pulses from a first radiation output, represented by a curve 167. It should be understood that the radiation outputs represented by curves 167 and 169 can be either the emissions from individual laser devices (e.g., laser device 171a in FIG. 5) or the output from an optical apparatus (e.g., optical apparatus 200 in FIG. 3).

Figure 8:
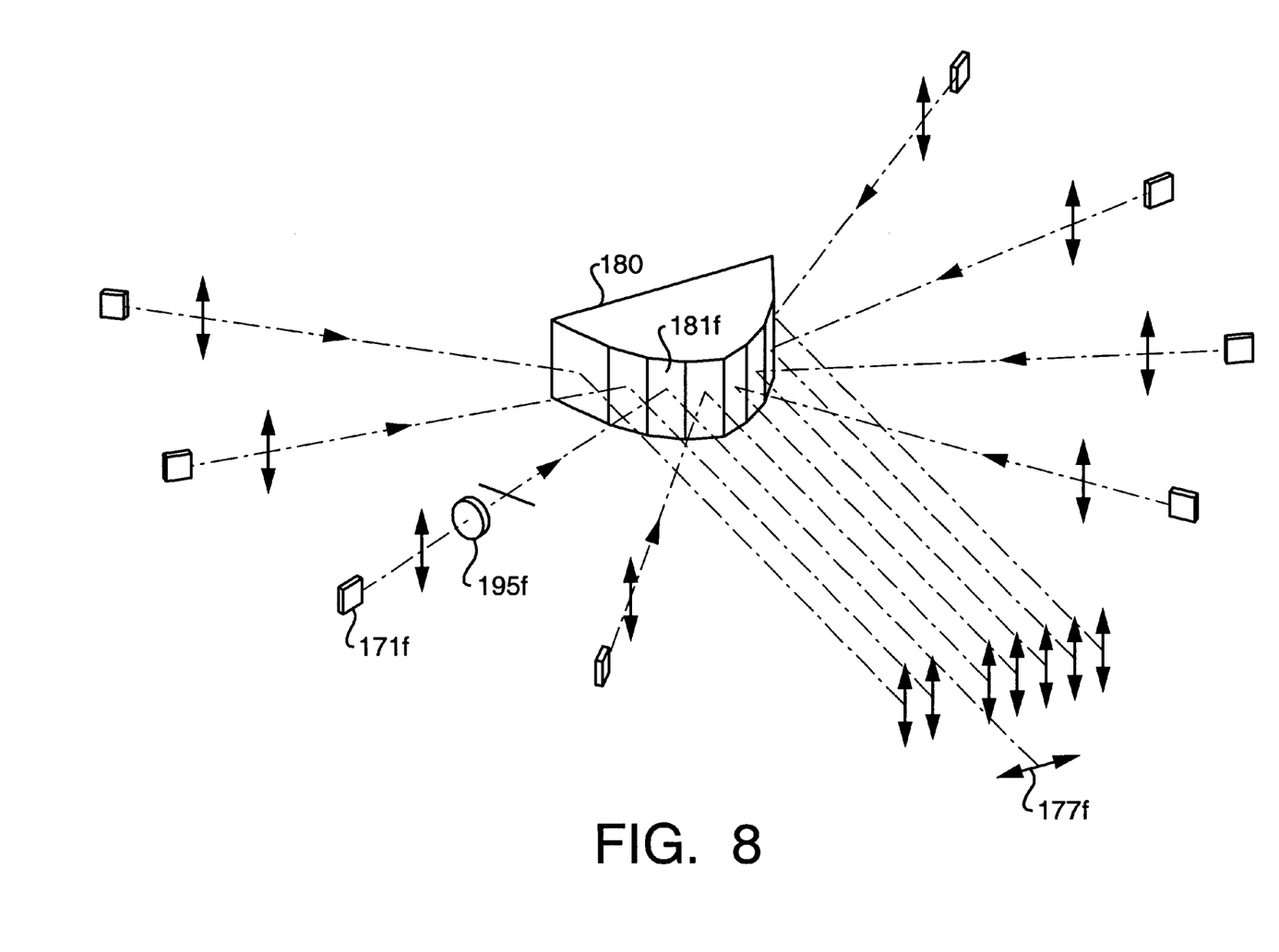
FIG. 8 is a diagrammatical representation of the unitary beam reflector of FIG. 5 showing the use of a half-wave plate to produce a different polarization in one of the radiation sources.

In another embodiment, shown in FIG. 8, one or more individual polarization devices are disposed near radiation sources. In the example provided, a half-wave plate 195f is disposed between laser device 171f and deflecting facet 181f of unitary beam deflector 180. As can be appreciated by one skilled in the relative art, half-wave plate 195f produces p-polarization at deflecting facet 181f as denoted by polarization vector 177f.

Figure 9:
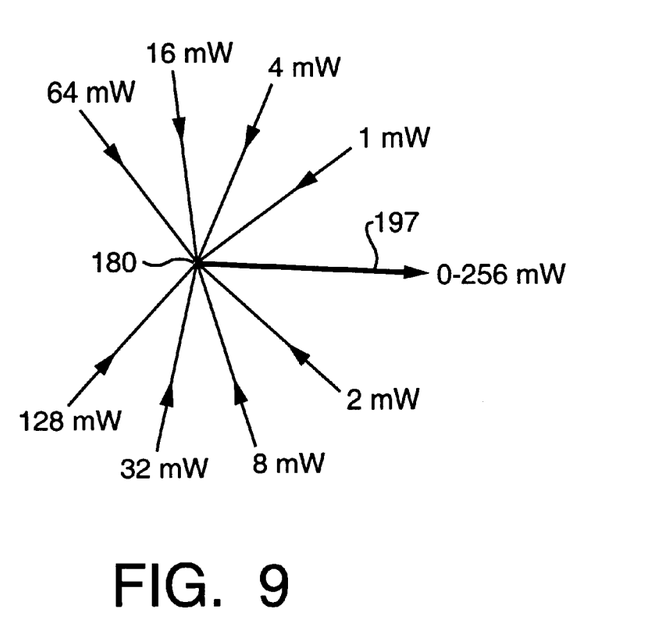
FIG. 9 is a diagram representing the step-wise variable output obtained from a plurality of radiation sources, each source having a different output power level.

The combined output of any of the above systems can be step-wise increased or decreased by utilizing radiation sources of different power outputs. The diagram of FIG. 9 illustrates that, by selectively operating eight radiation sources having output power levels of one milliwatt to 128 milliwatts, for example, beam deflector 180 can be used to produce an output 197 having a power level of from zero to 256 milliwatts.

Figure 10:
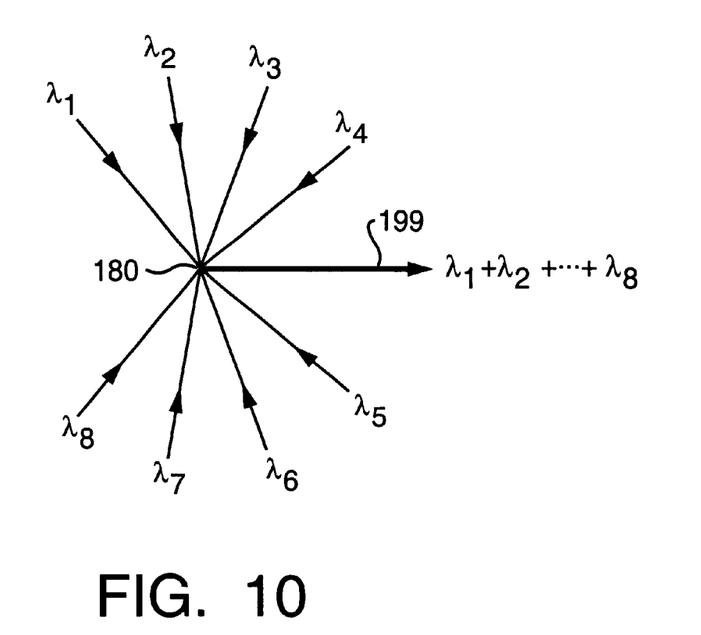
FIG. 10 is a diagram representing the mixing of radiation sources of different wavelengths.

In another application of the disclosed system and devices, a plurality of radiation sources, each emitting at a different wavelength, can be mixed into a single output. The diagram of FIG. 10 illustrates eight radiation sources, with different wavelengths $\lambda_i$, incident upon beam deflector 180 to produce a combined output 199. In the manner of an example, a fiber laser can be simultaneously pumped at 915 nm and 975 nm. By mixing radiation of different wavelengths in the optical fiber, a good color gamut can be realized.

Figure 11:
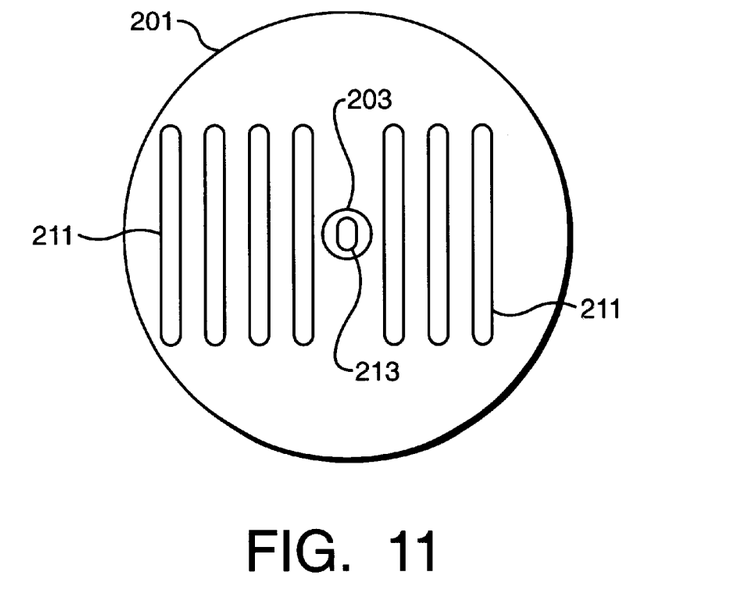
FIG. 11 is a diagrammatical representation of the cross-sectional view of a double-clad optical amplifier wherein pump radiation is input into the inner cladding and a signal beam is input into the core; and, FIG. 12 is a diagrammatical representation of the cross-sectional view of an clad optical fiber wherein radiation beams of varying widths are input into the cladding layer.
Figure 12:
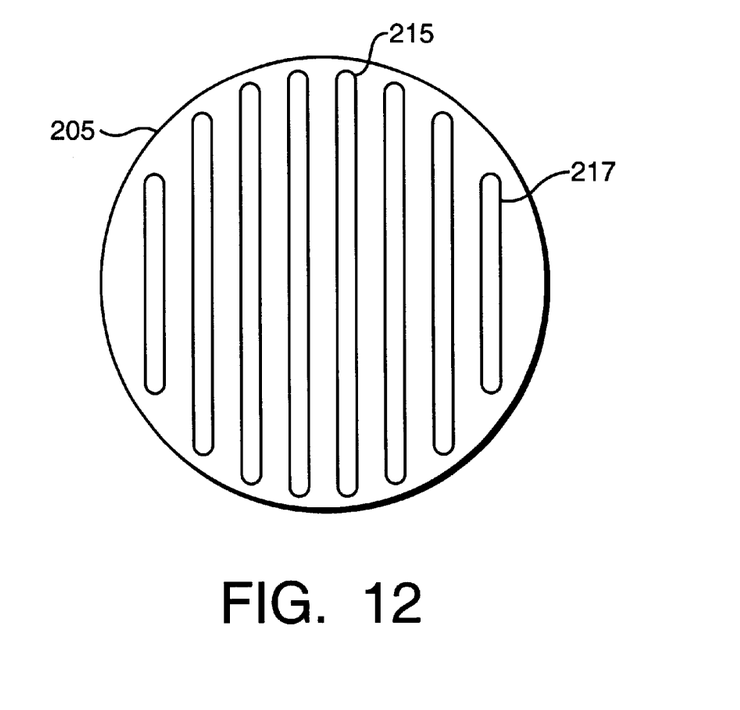

A double-clad amplifier, shown diagrammatically in cross section in FIG. 11, can be operated by utilizing a beam deflector 180 (not shown) for inputting pump radiation 211 into the inner cladding 201 of an optical fiber (here shown as having a circular cross-sectional shape), and by inputting a signal beam 213 into the fiber core 203. Alternatively, a circular inner cladding 205 can be used to more efficiently input both a relatively wide radiation beam 215 and a relatively narrow radiation beam 217.

While the invention has been described with reference to particular embodiments, it will be understood that the present invention is by no means limited to the particular constructions and methods herein disclosed and/or shown in the drawings, but also comprises any modifications or equivalents within the scope of the claims.

What is claimed is:

1. A system suitable for providing a source of optical radiation, said system comprising at least two discrete sources of optical radiation, an optical waveguide, a unitary beam deflector, at least two input afocal relay systems, and an output optical imaging system;

each said discrete source of optical radiation providing a radiation beam having a beam polarization vector corresponding to said radiation beam, each said source having a characteristic smallest portion;

the unitary beam deflector comprising at least two essentially planar deflecting facets, each said deflecting facet disposed in the optical path of one of said radiation beams and oriented so as to deflect the corresponding radiation beam toward said output optical imaging system, and thus into the optical waveguide;

each said input afocal relay system disposed in the optical path between one of said deflecting facets and one of said radiation beams, the one of said radiation beams being provided by one of said optical sources, each said input afocal relay system imaging said corresponding radiation beam onto said corresponding deflecting facet such that said characteristic smallest portion of said corresponding optical source is imaged onto said corresponding deflecting facet; and, the output optical imaging system disposed in the optical path between said deflecting facets and said optical waveguide, such that said facet beam images are juxtaposed and imaged onto said optical waveguide.

2. The system of claim 1 wherein said waveguide comprises an optical fiber.

3. The system of claim 2 wherein said optical fiber comprises a cladding layer having a cross-sectional shape in the form of a convex polygon.

4. The system of claim 1 wherein said unitary beam deflector comprises an optically-transparent material.

5. The system of claim 4 wherein at least one of said deflecting facets is oriented so as to deflect the corresponding radiation beam by means of total internal reflection.

6. The system of claim 1 wherein said deflecting facet comprises a diffraction surface.

7. The system of claim 1 wherein said deflecting facet comprises a reflecting surface.

8. The system of claim 7 wherein said reflecting surface comprises a dichroic reflector.

9. The system of claim 1 wherein said first deflecting facet forms a dihedral angle with said second deflecting facet.

10. The system of claim 1 wherein said deflecting facet is approximately 3.0 mm by 0.3 mm in size.

11. The system of claim 1 wherein said output optical imaging system comprises an afocal relay system.

12. A system suitable for providing a source of optical radiation, said system comprising at least two discrete sources of optical radiation, an optical waveguide, a unitary beam deflector, at least two input afocal relay systems, and an output optical imaging system;

each said discrete source of optical radiation providing a radiation beam having an output power level corresponding to said radiation beam, each said source having a characteristic smallest portion;

the unitary beam deflector comprising at least two essentially planar deflecting facets, each said deflecting facet disposed in the optical path of one of said radiation beams and oriented so as to deflect the corresponding radiation beam toward said output optical imaging system, and thus into the optical waveguide;

each said input afocal relay system disposed in the optical path between one of said deflecting facets and one of said radiation beams, the one of said radiation beams being provided by one of said optical sources, each said input afocal relay system imaging said corresponding radiation beam onto said corresponding deflecting facet such that said characteristic smallest portion of said corresponding optical source is imaged onto said corresponding deflecting facet; and, the output optical imaging system disposed in the optical path between said deflecting facets and said optical waveguide, such that said facet beam images are juxtaposed and imaged onto said optical waveguide.

13. The system of claim 12 wherein said waveguide comprises an optical fiber.

14. The system of claim 13 wherein said optical fiber comprises a cladding layer having a cross-sectional shape in the form of a convex polygon.

15. The system of claim 12 wherein said unitary beam deflector comprises an optically-transparent material.

16. The system of claim 15 wherein at least one of said deflecting facets is oriented so as to deflect the corresponding radiation beam by means of total internal reflection.

17. The system of claim 12 wherein said deflecting facet comprises a diffraction surface.

18. The system of claim 12 wherein said deflecting facet comprises a reflecting surface.

19. The system of claim 18 wherein said reflecting surface comprises a dichroic reflector.

20. The system of claim 12 wherein said first deflecting facet forms a dihedral angle with said second deflecting facet.

21. The system of claim 12 wherein said deflecting facet is approximately 3.0 mm by 0.3 mm in size.

22. The system of claim 12 wherein said output optical imaging system comprises an afocal relay system.

23. A fiber laser comprising at least two discrete sources of laser radiation, an optical fiber, a unitary beam deflector, at least two input afocal relay systems, and an output afocal relay optical system;

each said discrete source of laser radiation providing a laser beam having a beam polarization vector corresponding to said laser beam, each said source having a characteristic smallest portion;

the optical fiber comprising a first cladding layer;

the unitary beam deflector comprising at least two essentially planar deflecting facets, each said deflecting facet disposed in the optical path of one of said radiation beams and oriented so as to deflect the corresponding laser beam toward said output afocal relay optical system, and thus into the optical fiber;

each said input afocal relay system disposed in the optical path between one of said deflecting facets and one of said laser beams, the one of said laser beams being provided by one of said laser sources, each said input afocal relay system imaging said corresponding laser beam onto said corresponding deflecting facet such that said characteristic smallest portion of said corresponding laser source is imaged onto said corresponding deflecting facet; and, the output afocal relay optical system disposed in the optical path between said deflecting facets and said optical fiber, such that said facet beam images are juxtaposed and imaged onto said optical fiber.

24. The fiber laser of claim 23 wherein said first discrete source of laser radiation comprises a laser diode.

25. The fiber laser of claim 23 wherein said unitary beam deflector comprises an optically-transparent material.

26. The fiber laser of claim 23 wherein said deflecting facet comprises a diffraction surface.

27. The fiber laser of claim 23 wherein said deflecting facet comprises a reflecting surface.

28. A fiber laser comprising at least two discrete sources of laser radiation, an optical fiber, a unitary beam deflector, at least two input afocal relay systems, and an output afocal relay optical system;

each said discrete source of laser radiation providing a laser beam having an output power level corresponding to said laser beam, each said source having a characteristic smallest portion;

an optical fiber comprising a first cladding layer;

the unitary beam deflector comprising at least two essentially planar deflecting facets, each said deflecting facet disposed in the optical path of one of said radiation beams and oriented so as to deflect the corresponding laser beam toward said output afocal relay optical system, and thus into the optical fiber;

each said input afocal relay system disposed in the optical path between one of said deflecting facets and one of said laser beams, the one of said laser beams being provided by one of said laser sources, each said input afocal relay system imaging said corresponding laser beam onto said corresponding deflecting facet such that said characteristic smallest portion of said corresponding laser source is imaged onto said corresponding deflecting facet; and, the output afocal relay optical system disposed in the optical path between said deflecting facets and said optical fiber, such that said facet beam images are juxtaposed and imaged onto said optical fiber.

29. The fiber laser of claim 28 wherein said first discrete source of laser radiation comprises a laser diode.

30. The fiber laser of claim 28 wherein said unitary beam deflector comprises an optically-transparent material.

31. The fiber laser of claim 28 wherein said deflecting facet comprises a diffraction surface.

32. The fiber laser of claim 28 wherein said deflecting facet comprises a reflecting surface.

* * * * *